Jan. 8, 1924.
C. C. REASONER
1,480,116
TRANSFERRING AND WEIGHING TOWER
Filed March 13. 1922    2 Sheets-Sheet 1
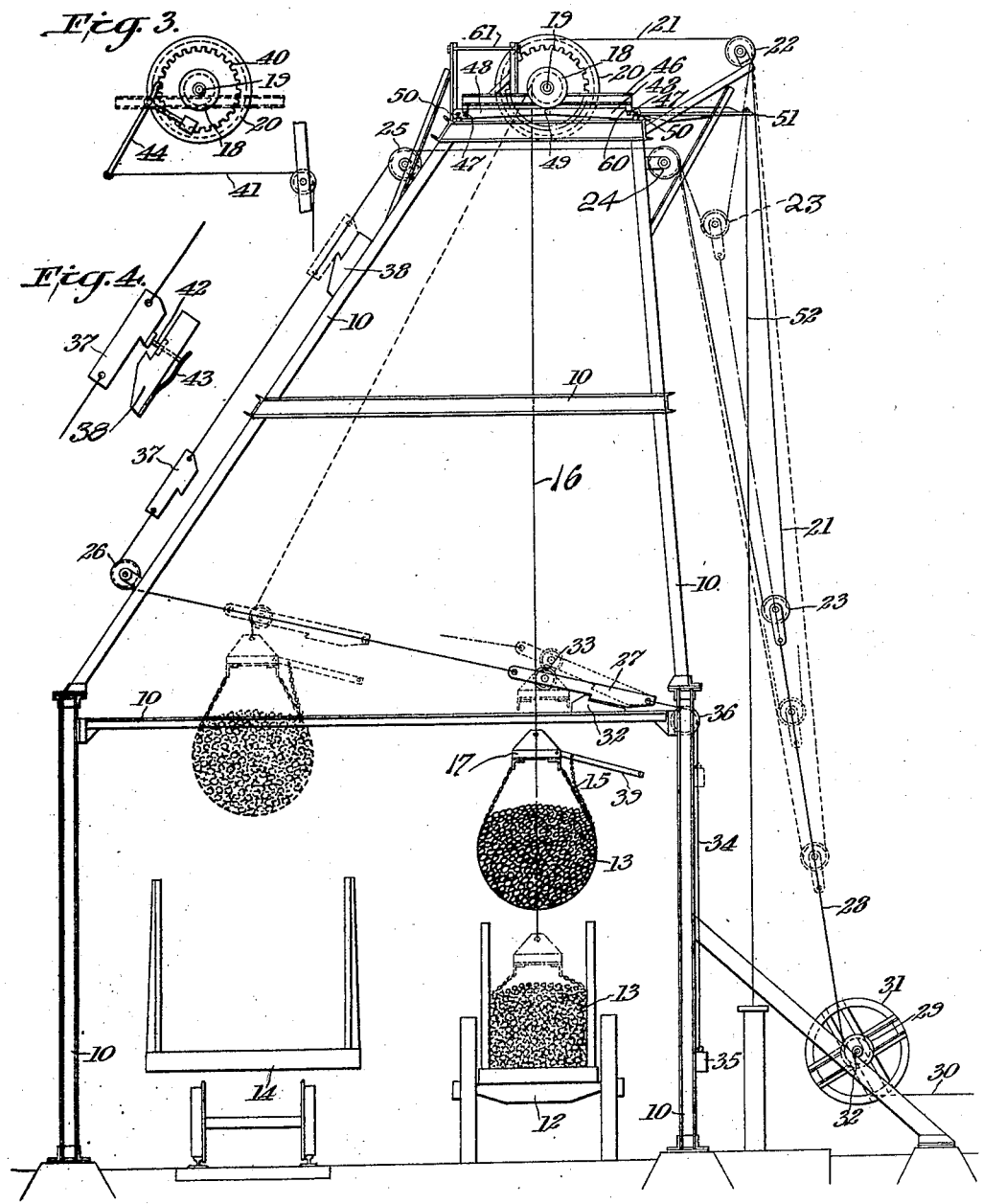

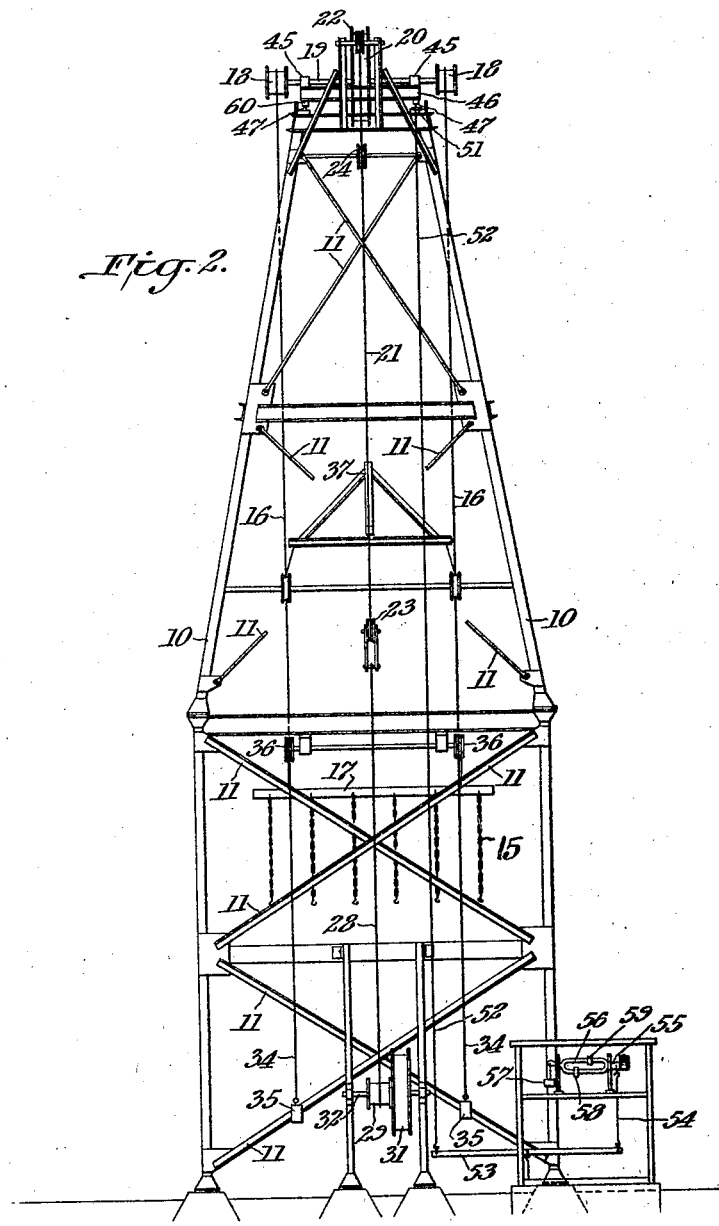

Patented Jan. 8, 1924.

1,480,116

UNITED STATES PATENT OFFICE.

CLAUDE CARTER REASONER, OF HABANA, CUBA.

TRANSFERRING AND WEIGHING TOWER.

Application filed March 13, 1922. Serial No. 543,362.

*To all whom it may concern:*

Be it known that I, CLAUDE C. REASONER, a citizen of the United States, residing at Habana, Cuba, have invented certain new and useful Improvements in Transferring and Weighing Towers, of which the following is a specification.

This invention relates to towers for transferring loads from carts or other vehicles to railroad cars and weighing the load during the transfer.

It is the general object of the invention to provide a transfer system of simple construction including a simple arrangement for weighing the loads during the transfer.

It is a more particular object to provide a transfer system including a simple arrangement for easily and quickly determining the net weight of the loads.

For a full understanding of the invention and the principles of operation on which it is based, reference is made to the accompanying drawings in which—

Fig. 1 is a front elevation of an arrangement embodying the invention;

Fig. 2 is a side elevation thereof; and

Figs. 3 and 4 are fragmentary views of details in elevation.

In the drawings 10 represents the frame work of the tower, some stays 11 being broken off to afford a clearer illustration of the operating mechanism. 12 represents a cart or truck from which a load 13 is to be transferred to the railroad car 14. In the particular instance shown the load consists of sugar cane carried in chain slings 15 or in any other load carriers well known in the art.

The transfer mechanism forming the principal part of the invention comprises essentially a rope or cable system so arranged that the transfer can be carried out simply by manipulation of a rope.

The weighing arrangement is so correlated to the transfer mechanism that the weighing operation can be carried out when the load is freely suspended from the hoist line, in substantially the same manner as any load placed upon a scale.

The hoist line is composed of two ropes 16 connected to a beam 17 carrying the chain slings 15. The ropes 16 run vertically upwardly and are secured to drums 18 mounted upon a shaft 19. Upon shaft 19 is mounted a wheel 20 of considerably larger diameter than the drums 18. Upon wheel 20 is wound a rope 21 which passes over sheaves 22, 23, 24, 25 and 26 to a hook 27. Sheave 23 is movable in a bight of the rope between sheaves 22 and 24 and is connected to a pulling rope 28 which is secured upon a drum 29. The drum 29 is turned by means of a rope 30 wound upon a wheel 31 mounted upon shaft 32 upon which also drum 29 is mounted.

Wheels 20 and 31 are used in conjunction with drums 18 and 29 in order to obtain the well known mechanical advantage or leverage in order to reduce the force necessary for hoisting to a relatively small amount.

To hoist the load from the cart, it is only necessary to pull on rope 30. Since the end of the rope 21 attached to hook 27 is firmly anchored, the pull upon sheave 23 causes a pull upon the end of the rope attached to wheel 20. As the sheave 23 is pulled downwardly the wheel 20 is turned and with it the drums 18 whereby the load is raised. The lifting action continues until the beam 17 comes to bear against the hook 27 causing it to be disengaged from the fixed counter hook 32.

The relation of parts is such that the end of the rope connected to wheel 20 is entirely unwound therefrom when the hook 27 is released. Continued pulling on the rope 30 therefore causes movement of that part of the rope only which passes over sheaves 24, 25 and 26. The hook 27 has at its front end an antifriction roller 33 and is connected at its rear end to ropes 34 to the end of which weights 35 are attached, the ropes 34 passing over sheaves 36 on the tower.

As the portion of the rope 21 is pulled over sheaves 26, 25 and 24 by the action of rope 30, the ropes 16 are drawn away from the vertical position into the position indicated in dotted line in Fig. 1, i. e. directly above the railroad car.

Between the sheaves 25 and 26 the rope 21 carries a latch hook 37 adapted to engage a counter hook 38 on the tower. The relation of the hook 37 and its counterhook 38 is such that the former will come into engaging relation to the latter when the position of the load over the railroad car or in other words the dotted line position has been reached.

When the rope 30 is now released, the load is free to descend into the railroad car. As the load is lowered, the drums 18 are turned and in turn wind up the rope 21 upon wheel 20 and lift sheave 23 part way to its original position. By means of a line (not shown) the lever 39 is operated to open the chain slings to discharge the load.

The wheel 20 is provided with a ratchet gear 40 which is engaged by a pawl 44 (see Fig. 3). The pawl holds the wheel 20 against movement in one direction i. e. holds the load in all positions. When the load has arrived over the railroad car, the pawl may be retracted by a line 41 to lower the load.

The counter hook 38 carries a plunger 42 acted upon by a spring 43 to normally force it outwardly. When the hook 37 slides over the counter hook 38, its beveled front edge rides over the head of the plunger and forces it inwardly against the tension of spring 43. The inward component of the force acting upon the hook 37 will cause it to snap into engaging position and interlock with the counter hook while the rope 21 is under tension.

As soon as the load is discharged, the tension on rope 21 is substantially released and the force of spring 43 is sufficient to force the hook 37 out of engagement and hold it free from the counter hook 38. Upon release of the rope 30, the weights 35 pull the hook 27 and with it the rope 21 back into their original position and the hook 27 engages its counter hook 32.

While reference has been made to hooks, counter hooks and various other detail taking part in the operation, it is understood that these elements may assume various forms. In referring specifically to these detail elements it is merely desired to point out the class of mechanism available for carrying out the transfer operation by the simple means of ropes in contradistinction to other more complicated arrangements for the same purpose.

Aside from the simplicity of the construction, the arrangement has the advantage of extreme simplicity of operation. As has been pointed out, the only work to be done by the operator is the pulling or slacking of the rope 30 and the release of the pawl 44 and the lever 39.

The rope 30 may be controlled by a drum (not shown), as is well understood.

The shaft 19 is supported in bearings 45 upon platform 46. The platform 46 in turn is supported in knife-edge bearings 47 upon a platform composed of two tables 48 the inner ends of which are pivoted together and form a hinge 49 while their outer ends rest upon knife-edge bearings 50. One of the tables 48 is rigidly connected to an arm 51. The arrangement constitutes in substance a balance system in which the arm 51 is the weight lever. The weight of the platform 46 is communicated to the tables 48 through vertical flanges 60 bearing upon the tables 48 near the knife-edge supports 50, whereby a relatively small force is sufficient in its action upon arm 51 to counterbalance the weight of the platform and the parts supported thereby.

A line 52 runs from the outer end of arm 51 down to near the ground where it is connected to one end of a lever 53 fulcrumed in the center and the other end of which is connected to a line 54. The line 54 is attached to the short arm 55 of a balance, the long arm 56 of which is the weight beam.

At the end of the long arm 56 is attached a weight 57 which may be adjusted to precisely counterbalance the force transmitted from arm 51 through line 52, lever 53 and line 54 to the short arm. This force represents the weight of the platform 46 together with all the parts mounted on it and acting on it through the drums 18 including the rope 16 and the load carrier. It is thus evident that when the carrier is loaded, as indicated in Fig. 1, the load represents the only force which is not counterbalanced upon the scale arm 56. It is therefore a simple manipulation to adjust the weights 58 and 59 to find the weight of the net load.

It should be observed that the rope section between the sheave 22 and the wheel 20 lies in a horizontal plane. Consequently the force acting upon it has no vertical component and the pull exerted upon the wheel 20 through this rope section does not sensibly affect the weighing operation. In order to resist the strain exerted upon the wheel and the parts connected therewith by the rope or cable 21, a drag-link 61 is placed between the scale and the tower proper. Any other expedient may of course be resorted to for that purpose.

It is understood that the form of the balance system at the top of the tower and the form of the scale system at the bottom may be radically changed within the scope of the invention.

It should be noted that the hoist ropes 16 are in effect only a single rope or line. It is also obvious that the line 21 is for all intents and purposes a continuation of line 16. In the claims therefore the term "hoist line" may be interpreted as the line running from the load to the hook 27 and having in its bight the sheave 23.

I claim:—

1. In a load transfer system, a line forming a bight intermediate its end, one end portion being supported for hoisting a load and the other end portion being supported for movement in a direction transversely of the hoist portion, a sheave mounted in the bight, means for exerting a pull on the sheave, means for limiting the upward movement of the hoist portion, means for releasably anchoring the transverse end portion and a loose connection between the two end portions allowing free movement of the hoist portion in vertical direction but causing lateral movement thereof when the transverse end portion is moved.

2. In a load transfer system, a line and a plurality of sheaves for supporting the line so that one end portion thereof freely depends to form a hoist portion and that the other end portion thereof extends transversely of the hoist portion, a bight intermediate the said end portions, a loose connection between the hoist portion and the transverse portion allowing free movement of the hoist portion in vertical direction but causing lateral movement thereof when the transverse portion is moved, a sheave in the bight, means for exerting a downward pull thereon, means for limiting the upward movement of the hoist portion, means for releasably anchoring the transverse portion and means operative during the upward movement of the hoist portion for releasing the transverse portion from its anchor.

3. Apparatus according to claim 2 in which the arrangement is such that the upward movement of the hoist portion is stopped immediately after the transverse portion has been released from its anchor.

4. In a load transfer system, a line having a bight intermediate its ends, sheaves for supporting the line so that one end portion thereof freely depends to form a hoist portion and that the other end portion thereof extends transversely of the hoist portion, a sheave in the bight and means for exerting a pull thereon, means for limiting the upward movement of the hoist portion, a loose connection between said transverse portion and the hoist portion allowing free movement of the latter in vertical direction but causing lateral movement of the same when the transverse portion is moved, means operative in one position of the said transverse portion to hold it against movement in one direction, means operative in another position of the said transverse portion to hold it against movement in opposite direction and separate means for making said holding means ineffective.

5. Apparatus according to claim 4 in which the means for making one of said holding means ineffective is connected with the hoist portion.

6. In a load transfer system, a tower, a line and a plurality of sheaves for supporting the line on the tower so as to form a hoist portion, a length having a portion disposed transversely of the hoist portion and a bight intermediate the hoist portion and the said length, a sheave in the bight and means for exerting a pull thereon, means for limiting the upward movement of the hoist portion, a loose connection between the transverse portion and the hoist portion allowing free vertical movement of the latter but causing lateral movement of the same when the transverse portion is moved, means on the transverse portion and on the tower forming a separable connection adapted to hold the transverse portion against movement in one direction, means on the tower and on the said length adapted to interlock when the said length has been moved to another definite position and to prevent movement in the reverse direction, means on the hoist end for severing the said separable connection during its upward movement and means responsive to the tension in said length for automatically separating the said locking means when the tension is relatively small.

7. In a load transfer system, a tower, a balance mounted upon the tower, a hoist line, a pivoted support for the hoist line upon one side of the balance, means acting upon the other side of the balance for establishing equilibrium and means for measuring the force transmitted to the balance through a load on the hoist line.

8. In a load transfer system, a tower, a balance mounted upon the tower, hoisting mechanism including a hoist line, a load carrier thereon and means on one side of the balance for supporting the hoist line, means acting upon the other side of the balance for establishing equilibrium and means for measuring the force transmitted to the balance through a load on the carrier.

9. In a load transfer system, a tower, a balance mounted upon the tower, hoisting mechanism including a hoist line, a load carrier thereon and means on one side of the balance for supporting the hoist line, means acting upon the other side of the balance for establishing equilibrium, a second support for the hoist line positioned in substantially the same horizontal plane as the support on the balance, means for counteracting the action of the force transmitted to the balance from the power end of the hoist line and means for measuring the force transmitted to the balance through a load on the carrier.

10. In a load transfer system, a tower, hoisting means including a drum and means for measuring the net weight of a load, comprising a balance on the tower, one side of the balance carrying the hoisting mechanism, means acting upon the other side of the balance to neutralize all forces acting thereupon except that due to the net weight of the load and means for measuring the effect of the net load on the balance.

11. In a load transfer system, a tower, a balance on the tower, a hoist line, a pivotal support for the hoist line upon one side of the balance, a plurality of sheaves on the tower for supporting a portion of the hoist line transversely of the portion depending from the pivotal support and for forming a bight intermediate the said pivotal support and the transverse portion, a sheave in the bight and means for exerting a pull thereon, means on the tower and on the line for holding the transverse portion against movement in one direction when it is in one of two positions and means on the tower and on the line for holding the transverse portion against movement in the opposite direction when it is in the other position, means for releasing said holding means, means for limiting the upward movement of the portion of the line depending from the pivotal support, means acting upon the other side of the balance for neutralizing the effects of the pivotal support and the depending portion of the hoist line upon the balance, means for measuring the effects of a net load upon the balance and a loose connection between the said depending portion and the transverse portion of hoist line allowing vertical movement of the former but causing it to move laterally with the latter.

12. Apparatus according to claim 11 including means for neutralizing the effects of the forces transmitted to the balance from the sheave in the said bight.

In testimony whereof, I affix my signature.

CLAUDE CARTER REASONER.